Oct. 20, 1964
D. Z. ERLE ETAL
3,153,428
HIGH-TEMPERATURE GAS-LIQUID ACCUMULATOR
Filed Sept. 22, 1961
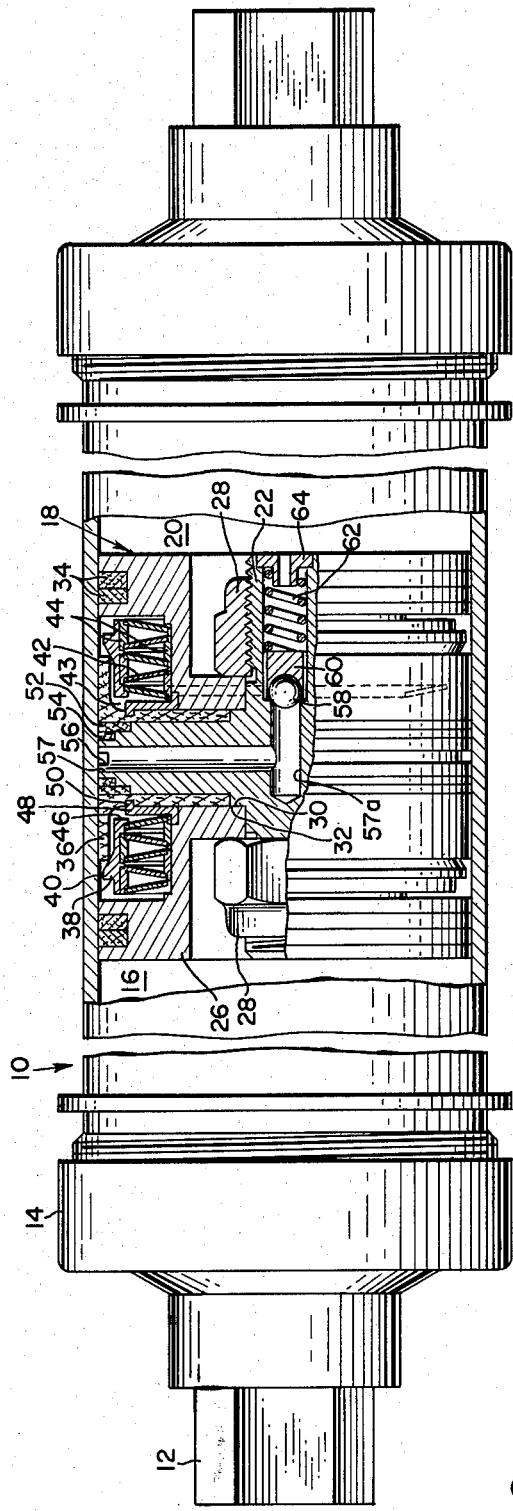
INVENTORS
DONALD Z. ERLE
RALPH L. VICK
BY
AGENT
ATTORNEY United States Patent Office 3,153,428
Patented Oct. 20, 1964

3,153,428
HIGH-TEMPERATURE GAS-LIQUID
ACCUMULATOR
Donald Z. Erle, Woodside, and Ralph L. Vick, Granada Hills, Calif., assignors, by mesne assignments, to the United States of America as represented by the Secretary of the Navy
Filed Sept. 22, 1961, Ser. No. 140,147
2 Claims. (Cl. 138—31)

The present invention relates to piston-type accumulators, and more particularly to means carried by the piston for effecting and maintaining a seal between the liquid and gas chambers of the accumulator when the assembly is subjected to a wide range of operating temperatures.

Many different types of accumulators are known in which a slidable piston is employed to separate a gaseous fluid present on one side of the piston from a liquid on the other. Such a piston is conventionally provided with a number of so-called O-rings, the primary purpose of which is to preclude entry of liquid into the gas chamber where it could produce an adverse effect upon operation of the device. However, such arrangements are not completely dependable for the reason that considerable leakage may occur around the sealing composition, especially when the temperature of the assembly varies over a fairly wide range. Specifically, it has been found that these O-ring-type seals do not operate at maximum efficiency at extreme temperatures, and particularly when the temperature is as low as −65° F. Such a condition may be encountered, for example, when the accumulator is to be employed on an aircraft designed for high-altitude flight.

If a pair of O-rings are respectively carried in annular grooves on opposite sides of the piston, with a further annular groove intermediate the two in which the rings are carried, then it has been found necessary to vent the center chamber either to atmosphere or to one of the fluid media. In the absence of such venting, leakage of oil into the center chamber, followed by an increase in temperature, may produce severe piston binding.

Although many types of standard sealing procedures are acceptable under environmental conditions where the ambient temperature varies only slightly during the operating cycle, they have been found to be generally unsuitable for utilization when this temperature is subject to fluctuations over a range which may extend from as low as −65° F. to as high as +450° F. In the face of such wide temperature changes, the considerable expansion or contraction of each individual component of the assembly tends to markedly reduce the sealing effectiveness of the assembly, especially when the pressure of the liquid and/or the fluid is relatively high.

The present invention accordingly has as its principal objective the provision of an accumulator in which substantially complete isolation of a liquid from a gas is achieved even though the accumulator is subjected to the temperature extremes which might be encountered, for example, when the device is installed on an aircraft capable of traveling at supersonic speeds and designed for high-altitude flight. The basic feature of the concept resides in the provision of seals on both the liquid and gaseous ends of the piston assembly, each of these seals being spring-loaded to provide satisfactory sealing action throughout the above-mentioned temperature range while at the same time requiring a minimum of contact load. Such a design not only has a long operating life, but requires substantially no maintenance in normal use.

Since effective sealing is brought about by spring-loading the seals, it is not necessary, and in fact it has been found to be undesirable, that the pressure thereacross have an appreciable value. Means are provided for releasing any gas which may be trapped between the two seals, and venting this entrapped gas to the liquid side by means of a check valve of particular design. This precludes such entrapped gas from expanding and hence deforming the liquid seal when the liquid pressure is "dumped." This liquid seal is primarily a wiper, and serves a very useful function since it prevents liquid transfer into the gas chamber during cycling at low temperatures. Without such a liquid seal, the viscous cold liquid tends to adhere to the barrel wall while the piston passes toward the liquid end, and is scraped into the gas chamber on the reverse action of the piston.

One object of the present invention, therefore, is to provide an improved device for effecting and maintaining a seal between the liquid and fluid chambers of a piston-type accumulator.

Another object of the invention is to provide a piston-type accumulator designed to operate efficiently over a wide range of temperatures.

A further object of the invention is to provide a piston-type accumulator for separating a liquid chamber from one containing a fluid such as gas, this accumulator embodying a plurality of spring-loaded seals which are effective to isolate each portion of the accumulator from the remaining portion regardless of the effects of expansion or contraction of the assembly, such effects tending to cause a leakage of the liquid into the gas chamber and a consequent reduction in the efficiency of operation of the accumulator.

Other objects and many of the attendant advantages of this invention will be readily appreciated as the same become better understood by reference to the following detailed description when considered in connection with the accompanying drawing, the single figure of which is a partly sectional view of a fluid-liquid accumulator designed in accordance with a preferred embodiment of the present invention.

Referring now to the drawing, there is shown an accumulator consisting of a barrel 10 in the form of a cylinder preferably composed of some metallic material such as stainless steel. This barrel (or body member) 10 is closed at each end by a cap or head 12 held in place in conventional fashion by some suitable means such as a nut 14. The particular means for closing each end of the barrel 10, however, forms no part of the invention and hence will not be described in greater detail. It is assumed, however, that one of the heads 12 is provided with an axial opening through which a fluid (such as gas) may pass in or out of a chamber 16 lying to one side of a slidable piston assembly (generally designated by the reference numeral 18) and the other of the heads 12 is provided with an axial opening through which a liquid may pass in or out of a corresponding chamber 20 lying on the opposite side of piston 18 from the gas chamber 16.

It is intended that the accumulator herein disclosed be capable of withstanding relatively great extremes in temperature, for example, from as low as −65° F. to as high as +400° F., at the same time operating without breakdown at pressures as high as 6,000 p.s.i. To achieve this objective, the piston assembly 18 is designed to include a flanged body member 22 a portion of which is shown cut away in the drawing to illustrate the particular sealing mechanism which constitutes the essence of applicants' invention.

This piston assembly 18 is formed with a pair of seals respectively associated with fluid chamber 16 and the liquid chamber 20. These two seals are identical in both design and operation, and hence only one will be described hereinafter although such description is obviously intended to apply to both units. With the above in mind, the fluid seal (hereinafter for convenience referred to as the gas seal, since gas is customarily the fluid used) of the piston assembly 18 is made up of a plurality of components associated with the piston body member 22. These include a head 26, of generally annular form, held in place by a nut 28 preferably of the self-locking type. As illustrated in the drawing, the head 26 is positioned so that an inwardly-facing surface 30 thereof abuts an outwardly-facing surface 32 of the flanged portion of the piston body member 22. In addition, the outer peripheral surface of the head 26 slidably engages the interior surface of the accumulator barrel 10. A pair of split wiper rings 34 are carried by the head 26 and serve as wipers and piston bearing surfaces. These split wiper rings 34 are preferably formed of some material having a low coefficient of expansion and a rather high resistance to abrasion, one example of such a material being that known by the trade name Teflon.

To preclude entry of liquid from chamber 20 into the gas chamber 16 under even extreme conditions of operation, the piston assembly 18 of the present concept makes use in each sealing assembly of a packing element which is identified in the drawing by the reference numeral 36. The latter is configured to extend radially over a portion of its length, and then to further extend longitudinally so that it contacts a considerable area of the interior surface of the accumulator barrel 10. It is this packing 36 which is intended to yield the sealing action required in the environment which has been discussed.

In order to be effective, the longitudinal portion of packing element 36 (which may also be formed of Teflon) is urged radially outwardly at all times under the influence of a spring-loaded expander 38 one surface of which is designed to contact the outer edge or extremity of packing element 36. To bring this about, the particular surface portion 40 of expander 38 which lies adjacent the packing element 36 is of irregular configuration and acts as a cam. This cammed surface portion 40 of expander 38 is so contoured that a radial outward movement of the expander tends to force the material of which the packing element 36 is composed against the interior surface of the accumulator barrel 10 and hence precluded passage thereby of fluid from its associated chamber.

To achieve this radially-outward urging of the expander 38, a spring assembly is provided which includes a plurality of spring elements 42. Although five such elements are shown as being employed in each sealing unit, this figure is not critical, and more or less than the number illustrated may be used according to the conditions under which the assembly is intended to operate. These spring elements 42 are annular in outline, and are designed to lie in a chamber 43 formed by the barrel 10, head 26 and packing 36. Consequently, they also lie intermediate the opposite surface of the expander 38 from that on which the cammed surface 40 is formed, on one hand, and one surface of the head 26 which is concentric with the longitudinal axis of the piston on the other. The spring elements 42 are initially "stacked" in a plane normal to the longitudinal axis of the barrel 10. Each such element 42 is separated from adjacent elements by a spacer 44. The individual sealing units of the illustrated mechanism consequently utilize four spacers, two of which are of a radial diameter slightly less than the inside diameter of the expander 38 and the remaining two which are of a diameter slightly greater than the radial diameter of the outer surface of the head 26 with which the spring elements 42 are in contact. This arrangement precludes any longitudinal displacement of the spring elements 42 during a slidable movement of the piston assembly 18. The spring assembly is further held in place by a shoulder 46 formed on the expander 38 and extending radially inwardly therefrom.

The annular width of the spring elements 42 is comparable to, or less than, the annular width between the spacers 44. Therefore, when the head 26 is drawn toward the piston 22, the elements 42, being alternately supported on their inner and outer diameters when forming the spring stack, serve as an axial spring which evenly loads the expander 38, rather than tending to "cock" the same as does a helical spring. The expander 38 is consequently loaded radially, and provides excellent lip seal loading by what may be described as a conical wedging action.

To preclude any appreciable displacement from position of the packing substance 36 when the assembly is operated under extreme pressures and/or temperatures, it has been found desirable to incorporate in the disclosed assembly a metallic plate 48 which lies between the packing material 36 and one surface of the head 26. To simplify the assembly, this plate 48 may be provided with a projecting lip 50 which extends into the body of the packing 36 and tends to lock the latter in place and prevent any appreciable radial movement of the member as a whole when a compressional force is applied thereto through expander 38 during normal operation. A further ring 52 (preferably formed of the same material of which the packing 36 is composed) lies on the opposite side of the packing 36 from the plate 48. This ring 52 acts as a backup, and is the member which will undergo extrusion (if any such should occur) rather than the packing 36 itself. Adjacent the backup 52 is a pair of further backups 54 which may be in the form of a pair of stainless steel rings. The backups 54 tend to close the gap between the inner diameter of the barrel 10 and the outer diameter of the piston assembly 18, and thereby practically eliminating any possibility that the material of which packing 36 is composed will extrude or flow in a longitudinal direction.

As above mentioned, the leakage path between the packing element 36 and the interior surface of the barrel 10 is sealed through the action of the expander 38 "loading" the lip of the packing element 36 to the interior surface of the barrel. The loading thus applied to the packing lip is derived from the spring assembly which includes the spring elements 42 spaced from one another by the annular "washers" 44, the spring elements being thereby "stacked" in such a manner that they are placed under tension. As above brought out, this axial compression load on the elements 42 provides a radial seal load. The spring rate of the assembly varies with the number of spring elements 44 which are utilized.

It will be noted from the drawing that tightening of the nut 28 acts to apply pressure to the head 26 and thereby compress the radial portion of the packing element 36 between such head and one surface of the body member 22. This torque load obtained by tightening of the nut 28 provides enough deformation of the packing material 36 to seal the inner portion of the assembly throughout the temperature range indicated. It will be also noted that the plate 48 provides additional face support for the packing element 36 beyond that which is provided by the surface of the head 26 which lies in contact therewith. The backup 52 functions as a wiper and also serves as a guide for the piston assembly during operation.

The piston body member 22 is provided with an annular groove 56 located intermediate the ends thereof, the region thus formed by the groove 56 constituting a central area between the gas and the liquid seals. It has been found in practice that any gas trapped in this region between the two seals tends to deform the liquid seal when the liquid pressure is released. To overcome this drawback, the central area is vented to the liquid chamber 20 through a radial opening 57 and an axial passageway 57a to a low-pressure relief valve assembly consisting of the ball 58, pinion 60, spring 62 and guide 64. This valve assembly limits the pressure in the central region formed by the groove 56 to a value below that at which the liquid seal will deform, while at the same time permitting the liquid seal to operate in such a manner as to preclude any appreciable transfer of liquid to the gas chamber 16 of the accumulator.

Obviously many modifications and variations of the present invention are possible in the light of the above teachings. It is, therefore, to be understood that within the scope of the appended claims the invention may be practiced otherwise than as specifically described.

We claim:

1. A pressure accumulator comprising a tubular barrel having a fluid port and a liquid port at the respective ends thereof, a piston body member receivable in said barrel and designed for slidable movement between said ports, thereby establishing a fluid chamber and a liquid chamber on opposite sides of said piston, a pair of sealing assemblies carried by said piston on the respective portions thereof proximate said fluid and liquid chambers, each sealing assembly including an annular head having a pair of flanges one of which extends radially outwardly to the inner surface of said tubular barrel and the other of which extends radially inwardly to contact one surface of said piston body member, a packing element extending radially outwardly between said piston body member and the inwardly-extending flange of said head for a portion of its length and then axially for the remaining portion of its length where it lies in contact with the inner surface of said barrel, such packing element defining one boundary of a spring-receiving chamber another boundary of which is defined by the outwardly-extending flange of said head, an annular expander having a cammed surface portion and located within said spring-receiving chamber so that the cammed surface portion contacts the outer lip of said packing element, and spring means also located within said spring-receiving chamber for urging said expander radially outwardly to wedge the cammed surface portion of said expander against the outer lip of said packing element, the latter being thus subjected to a radial loading against the inner surface of said barrel to thereby preclude passage thereby of the substance in the accumulator chamber proximate thereto, said spring means comprising a plurality of ring-shaped discs of resilient material spaced longitudinally from one another along the axis of said tubular barrel and lying in unitary fashion radially inwardly from said expander between the inner surface of the latter and one surface of said head, each of said ring-shaped discs being positioned in other than parallel relationship with those discs immediately adjacent thereto, whereby a positioning of said head with respect to said piston body member will establish a radial outward pressure on said expander and consequently a radial outward loading on said packing element to urge the latter against the inner surface of said barrel, and whereby an axial movement of said head will be transmitted by said plurality of ring-shaped discs into an axial movement of said expander, the cammed surface portion thereof acting to wedge the said packing element more tightly against the inner surface of said barrel.

2. A pressure accumulator according to claim 1 in which said piston body member is formed with an annular groove intermediate said pair of sealing assemblies as well as with a central fluid-receiving chamber, a passageway connecting said groove with said fluid-receiving chamber, and means for venting said fluid-receiving chamber to the liquid chamber of said accumulator, said venting means being pressure-responsive so that the venting action occurs only when the pressure in said fluid-receiving chamber reaches a predetermined level, said venting means comprising a spring-loaded check valve located between the fluid-receiving chamber formed centrally in said piston and the liquid chamber of said accumulator.

References Cited in the file of this patent

UNITED STATES PATENTS

| 1,284,341 | Honegger | Nov. 12, 1918 |
| 1,963,270 | Huffman et al. | June 19, 1934 |
| 2,417,873 | Huber | Mar. 25, 1947 |
| 2,720,220 | Gratzmuller | Oct. 11, 1955 |
| 2,817,361 | Mercier | Dec. 24, 1957 |

FOREIGN PATENTS

| 816,832 | Great Britain | July 22, 1959 |